US006840067B2

(12) United States Patent
Mass et al.

(10) Patent No.: US 6,840,067 B2
(45) Date of Patent: Jan. 11, 2005

(54) MODIFIED SHUSS KNITTED NETTING

(75) Inventors: Nissim Mass, Kibbutz Mishmar Ha'Emek (IL); Yuval Lieber, Kibbutz Mishmar Ha'Emek (IL)

(73) Assignee: Tama Plastic Industry, Kibbutz Mishmar Ha'Emek (IL)

( * ) Notice: Subject to any disclaimer, the term of this patent is extended or adjusted under 35 U.S.C. 154(b) by 64 days.

(21) Appl. No.: 09/781,562

(22) Filed: Feb. 13, 2001

(65) Prior Publication Data

US 2001/0004572 A1 Jun. 21, 2001

Related U.S. Application Data

(62) Division of application No. 09/641,949, filed on Aug. 21, 2000, which is a continuation of application No. 08/978,235, filed on Nov. 25, 1997, now abandoned.

(51) Int. Cl.[7] .......................... D04B 21/10; D04B 21/12; B65D 7/00
(52) U.S. Cl. .............................. 66/203; 66/214; 442/1; 442/304; 442/308; 442/312; 206/83.5; 206/410
(58) Field of Search ............................ 442/1, 304, 305, 442/312, 308; 66/203, 208, 214, 825, 195; 206/83.5, 410; 428/105, 107, 112, 113, 131

(56) References Cited

U.S. PATENT DOCUMENTS

| 3,646,782 | A | 3/1972 | Kohl |
| 4,569,439 | A | 2/1986 | Freye et al. |
| 4,570,789 | A | 2/1986 | Fritz et al. |
| 4,781,291 | A | 11/1988 | VanGinhoven |
| 4,917,008 | A | 4/1990 | van den Wildenberg |
| 5,104,714 | A | 4/1992 | Leiber et al. |
| 5,256,353 | A | 10/1993 | Leiber et al. |
| 5,660,062 | A | 8/1997 | Diestal et al. |

FOREIGN PATENT DOCUMENTS

| DE | 69 36 578 | 1/1970 |
| DE | 4 301 231 | 7/1994 |
| DE | 4 301 232 | 7/1994 |
| EP | 0 304 104 | 2/1989 |
| EP | 0 304 977 | 3/1989 |
| FR | 2061251 | 5/1971 |
| WO | 94/17230 | 8/1994 |

OTHER PUBLICATIONS

Leo English/Germany Dictionaly Internet Website, search for "schuss" and "franse".
Multilingual Glossary of Textile Terminology, German Entry Volume, Mass. Inst. of Tech.; 1972—entries for "schuss" and "franse".
Beitriebsanleitung– Working Instructions—Maschinen Nr.: 65769 Auflage—Apr. 1980.
Offene Umhüllungsnetze mit hoher Leistung Herstellen aus Kettenwirk–Praxis 3/90, Obertshausen, pp. 11–14 (1990). (translation attached).
Musternetz "Maglia Larga".
*Dialog* Printout (INPADOC Patent Family) for DE 6936578, 2 pp.
*Dialog* Printout (INPADOC Patent Family) for DE 4301232 A1, 7 pp.
*Dialog* Printout (INPADOC Patent Family) for US 4,781, 291, 5 pp.
W. Schinkoreit in Melliand Textilberichte Dec. 1995, "Wirktechniken durch Fadenreservebildung in Schussrichtung", p. 1090 and its translation, "Knitting Methods Based on yarn Reserve Formation in the Weft Direction," (1 page).
*Dialog* Printout (INPADOC Patent Family) for DE 4 301 232 A1, 7pp.

*Primary Examiner*—Cheryl A. Juska
(74) *Attorney, Agent, or Firm*—Morgan & Finnegan, L.L.P.

(57) ABSTRACT

A knitted netting includes longitudinal polyolefin ribbons and lateral polyolefin ribbons knitted with the longitudinal polyolefin ribbons to form knitted netting. The lateral polyolefin ribbons of the knitted netting have an actual shuss length more than 110% of a calculated shuss length for the knitted netting. The actual shuss length being in excess of 110% of the calculated shuss length for the knitted netting prevents transverse shrinkage of the netting.

29 Claims, 7 Drawing Sheets

MODIFIED SHUSS KNITTED NETTING

This is a divisional of co-pending application Ser. No. 09/641,949, filed Aug. 21, 2000, which is continuation of Ser. No. 08/978,235 filed Nov. 25, 1997 now abandoned.

BACKGROUND OF THE INVENTION

The invention relates to knitted netting, and more particularly, to knitted netting as is used in wrapping, e.g., loads on pallets and bales of agricultural products. More particularly, the invention relates to knitted netting used in wrapping wherein the knitted netting is designed to minimize the transverse shrinkage of the netting.

In 1 FIG. 1, Raschel knitted netting 10, including shuss (schuss), or "lateral" ribbons 12, and franze (longitudinal) ribbons 14, also known as franse ribbons, is shown and further described in U.S. Pat. No. 5,104,714 to Lieber et al. Because of the triangular pattern in the knitted netting, all Raschel netting becomes narrower when pulled lengthwise. For example, when wrapping a pallet with conventional Raschel netting, when the netting is stretched about 60%, the netting may change in width from 50 cm to about 25 cm. When a longitudinal force is applied to the knitted netting, the franzes become longer. The longer the franze gets, the longer the shuss must be to maintain the same netting dimensions. However, up to a certain degree of elongation, the shuss does not extend because the shuss tends to straighten rather than elongate. The straighter the shusses, the smaller the distance between franzes, and the narrower the netting becomes resulting in transverse shrinkage of the knitted netting.

Transverse shrinkage has been inherent in Raschel knitted netting for as long as machines to produce such knitted netting have existed. It is well known that conventional Raschel netting becomes narrower even while being knitted on Raschel knitting machines. For example, if 48" Raschel knitted netting is desired, about 50" netting is knitted because the netting becomes narrower by about 2" between the knitting and the winding zones.

When a constant netting width is needed, the width can be regulated by changing the shuss tension in the knitting machine. The producers of knitted netting machines provide a facility on their machines to regulate the netting width, which depends on many factors including the type of material, temperature, ribbon dimensions, knitting tension, and knitting pattern. The knitting machine producers are aware that netting shrinkage is inherent in Raschel knitted netting. Such producers are also aware that increased tension on the shuss creates a narrower netting and loosened tension on the shuss prevents narrowing to some degree. Changing the shuss tension, however, is insufficient to fully overcome transverse shrinkage in knitted netting.

In the prior art is U.S. Pat. No. 4,781,291 to Van Ginhoven which is directed to an extruded netting. Van Ginhoven recognizes that a problem in Raschel knitted netting "is that it shrinks in overall width when pulled lengthwise". (Col. 1, line 19.) Thus, Van Ginhoven appreciates that Raschel knitted netting shrinks when pulled lengthwise due to the geometric pattern of the knitted netting. Van Ginhoven addresses this problem by proposing a netting of square openings, instead of Raschel triangles, to solve the problem. By having transverse strands perpendicular to the longitudinal strands, creating rectangular openings instead of triangular, transverse shrinkage is overcome.

Accordingly, there is a need in the art for a knitted netting which does not shrink at all during the production process. Further, there is a need in the art for a knitted netting that maintains its full width during production and may also be widened to more than its full production width.

SUMMARY OF THE INVENTION

With the foregoing in mind, the Modified Shuss Knitted Netting in accordance with the invention provides a "modified" shuss relative to the shuss of conventional knitted netting. A modified shuss is a shuss whose length is as long as is desired, which is in excess of and distinct from conventional knitted netting with shuss loosened only to the maximum permitted by the knitting machine. The netting according to the present invention may have at least one modified shuss 18, may include modified shusses 18 located along the outside edges of the netting, or all of the shusses of the netting may be of the modified design. Each modified shuss may be formed a plurality of ribbons or from a single ribbon.

In accordance with the invention, a knitted netting includes longitudinal polyolefin ribbons (also known as franse ribbons) and lateral polyolefin ribbons (also known as schuss ribbons) knitted with the longitudinal polyolefin ribbons to form knitted netting. The lateral polyolefin ribbons of the knitted netting have an actual shuss length more than 110% of a calculated shuss length for the knitted netting.

In accordance with a further aspect of the invention, a wrapped bale of agricultural crops includes a cylindrical bale of agricultural crops and a knitted netting having longitudinal polyolefin ribbons and lateral polyolefin ribbons knitted with the longitudinal polyolefin ribbons to form knitted netting. The lateral polyolefin ribbons of the knitted netting have an actual shuss length more than 110% of a calculated shuss length for the knitted netting. The knitted netting may also extend about the circumference and over the edge of the cylindrical body enclosing and maintaining the crops therein.

BRIEF DESCRIPTION OF THE DRAWINGS

The accompanying drawings, referred to herein and constituting a part hereof, illustrate preferred embodiments of the invention and, together with the description, serve to explain the principles of the invention, wherein.

DETAILED DESCRIPTION OF THE DRAWINGS

Figure 1:
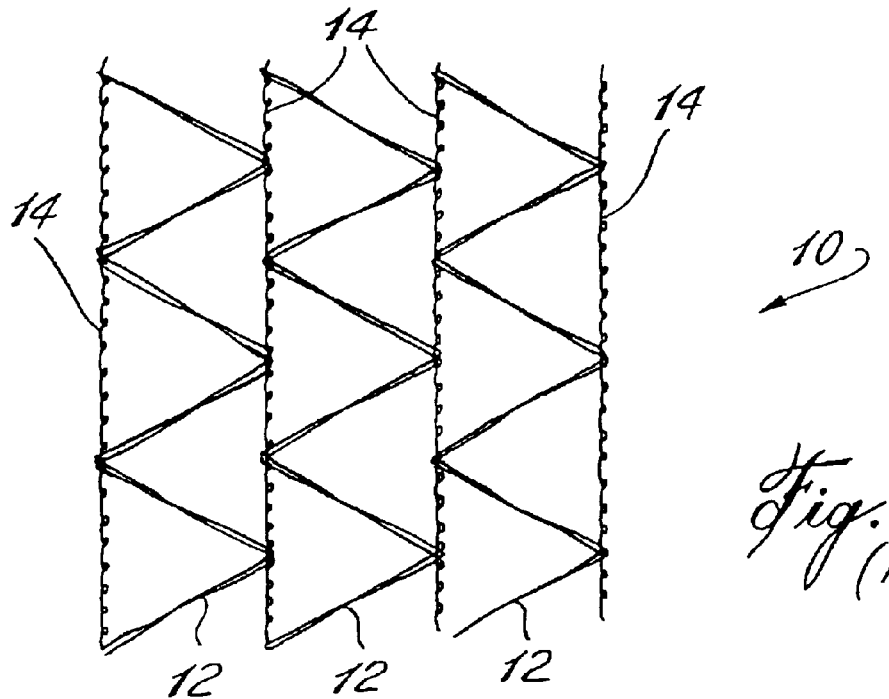
FIG. 1 shows a conventional knitted Raschel netting.
Figure 2:
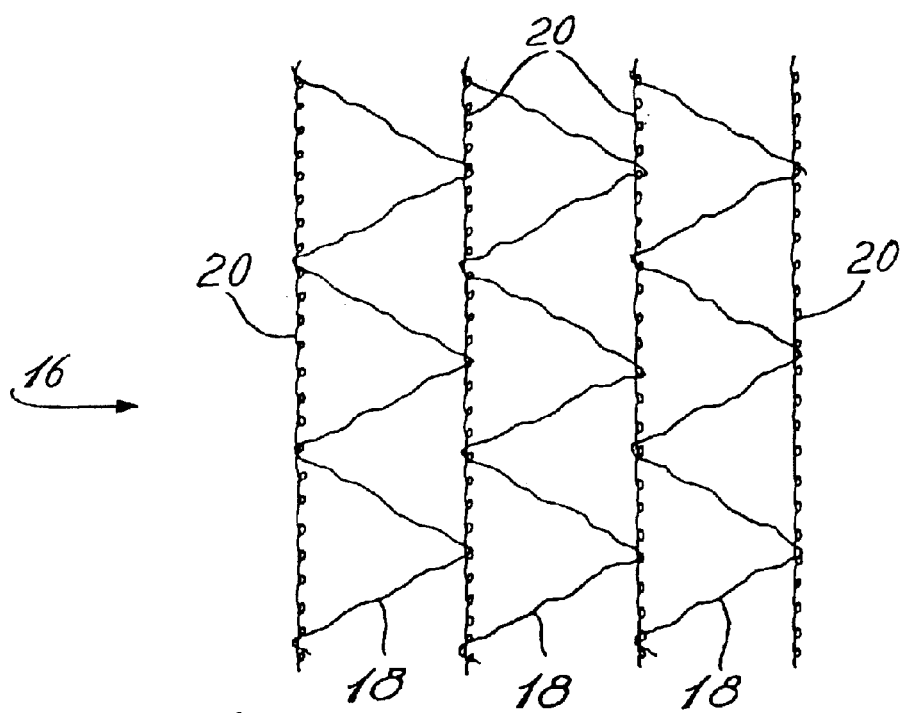
FIG. 2 shows a knitted Raschel netting in accordance with the invention.

FIG. 2 shows a knitted Raschel netting 16 in accordance with the invention which provides a "modified" shuss 18 relative to the shuss of conventional knitted netting. The modified shuss has a length longer than the shuss length obtained when loosened to the maximum permitted by the knitting machine. For example, a knitted netting including a modified shuss that is about 30% longer than the prior art shuss provided by the knitting machine becomes narrower by about 12% at 60% elongation of the knitted netting during wrapping, while the same netting without modified shuss becomes narrower by about 50% at 60% elongation.

The shuss is created by moving the shuss ribbon between two needles while the netting being knitted moves longitudinally in the knitting machine. Because of the two directional movement, the shuss 18 creates legs of a triangle while the franze 20 creates a triangle base. The tension of the shuss can be adjusted, but is limited and can only produce shuss with an actual length less than 110% of the calculated length of the leg of the triangle created by moving the shuss ribbon between two needles at the longitudinal speed.

The preferred amount of elongation of the shuss length depends upon the particular netting application. For elastic pallet wrapping, the preferred actual shuss length is about 135% of the calculated shuss length for the netting. For conventional wrapping netting with an elongation at break of about 20%, a modified shuss is not needed because such netting only elongates about 1–3% in normal use and does not exhibit transverse shrinkage.

Figure 3A:
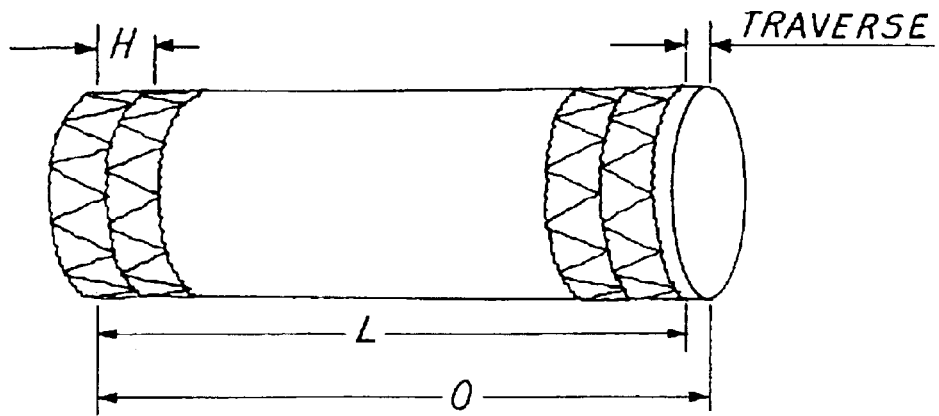
FIG. 3a illustrates a roll of knitted netting.
Figure 3B:
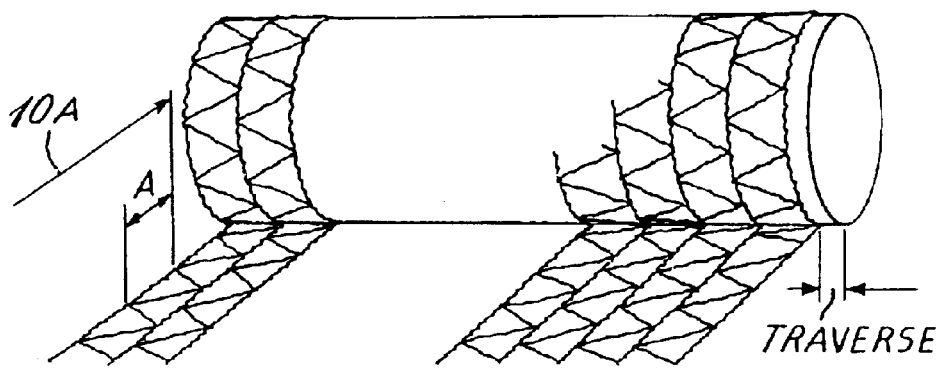
FIG. 3b illustrates a partially unrolled roll of knitted netting.
Figure 3C:
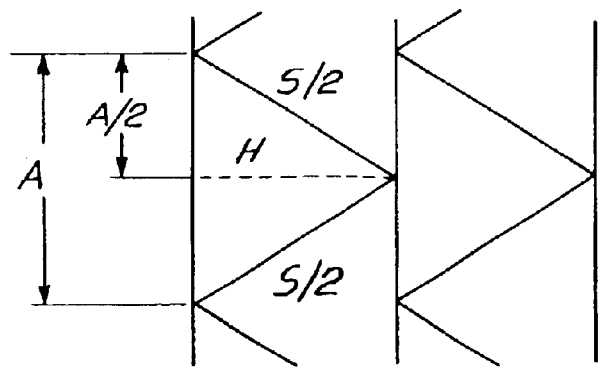
FIG. 3c illustrates calculation of shuss length for knitted netting.

The characteristics of the Modified Shuss Knitted Netting according to the invention may be seen by comparing an actual shuss length of a given netting length more than 110% of the calculated shuss length. The Modified Shuss Knitted Netting exhibits reduced lateral shrinkage relative to netting produced with an actual ribbon length equal to the calculated ribbon length upon elongation of up to 100%. The suggested procedure for comparing actual shuss length with calculated shuss length is illustrated in FIGS. 3a through 3c and may be described as follows:

(1) Measure the length (L) between the two extreme franzes on a roll of knitted netting as shown in FIG. 3a. (The overall roll length is shown as O.)

(2) Divide the length (L) by the number of franzes minus one to define an average distance between two franzes (H).

(3) Define an average length (A), i.e., the base, between two triangle legs each having a length (S/2), by unrolling some of the knitted netting, measuring the total length often such "bases" and dividing that total length by 10 to define the average length. (A) as shown in FIG. 3b. This measurement should be performed while applying about 50 g to the franzes on which the shuss will be measured.

(4) Calculate the shuss (S) length between two triangle legs as shown in FIG. 3c as follows:

$$S = 2\sqrt{(A/2)^2 + H^2}$$

(5) Determine an actual shuss length for distance 10A by unrolling some of the knitted netting and transversely cutting the franzes and shusses. Take out the shuss between two franzes and measure the length of the shuss while flattening the shuss on a flat plate to determine the actual shuss length (ASL).

(6) For Modified Shuss Knitted Netting, ASL will exceed 10S by more than 10%.

In summary the calculation may be described as $$100 \times \frac{\text{measured shuss length}}{\text{calculated shuss length}} = \% \text{ modification}$$

Therefore the modified, i.e., actual, lateral/shuss ribbon length may be defined as being at least 10% greater in length th the calculated lateral/shuss ribbon length, which is synonymous with the definition, a modified or actual lateral/shuss length that is 110% of a calculated lateral/shuss length.

Existing Raschel knitting machines do not provide a facility for providing modified shuss. The maximum loosened shuss which can be knitted on these machines can at best widen the netting a little bit, but even so the netting will tend to narrow.

Figure 4A:
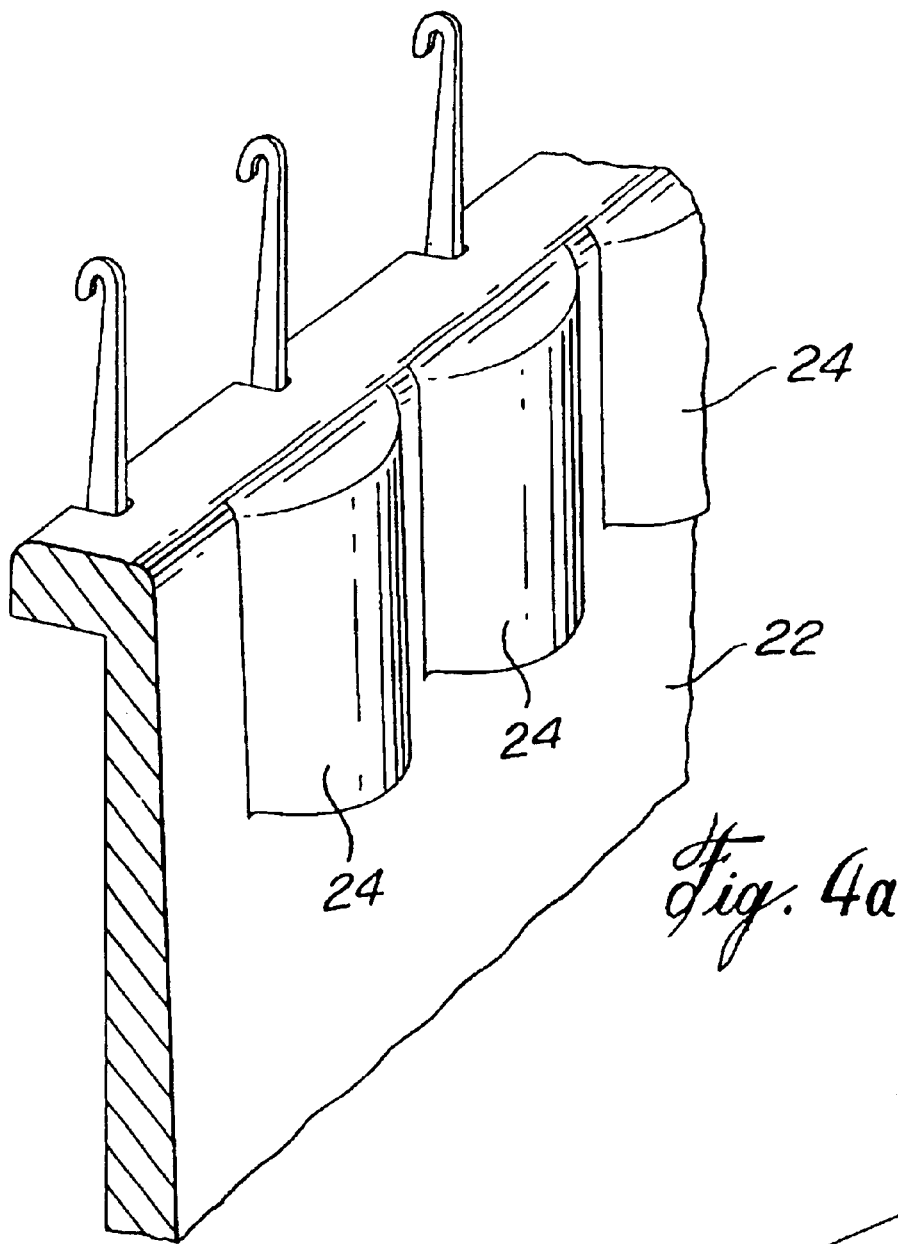
FIG. 4a shows a corrugated trick plate for use in a knitting machine.
Figure 4B:
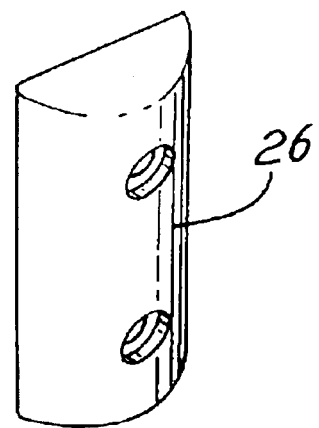
FIG. 4b shows a single round piece for use with a corrugated trick plate.

In order to create the modified shuss according to the invention and to overcome such knitting machine limitations, a corrugated trick plate as shown in FIG. 4a may be incorporated into the knitting machine. The use of a conventional trick plate is illustrated, for example, in U.S. Pat. No. 3,646,782 to Kohl. The corrugated trick plate includes a flat plate 22 providing corrugations 24 which force the shusses to traverse a longer distance as the shusses move between the knitting machine needles than would be traversed in a conventional knitting machine. The shusses cannot move in a straight line; the shusses must follow the curvature of the corrugated trick plate. Accordingly, when the knitted netting leaves the corrugated trick plate, the shuss length is longer than the original. The thicker the corrugations between needles on the flat plate, the longer the shusses that are produced.

Where an equal amount of shuss modification is needed over the complete netting width, a corrugated plate as described with respect to FIG. 4a may be used. Where modified shuss is required only on particular shusses, a flat plate absent corrugations (not shown) may be used to produce a thicker area between particular needles. This can be achieved by attaching a round piece 26 to the flat plate by means of a screw or other suitable fastener. Round piece 26 is shown in FIG. 4b.

With the Modified Shuss Knitted Netting it is not possible to regulate the netting width by increasing the shuss tension as was done in conventional knitted netting. When knitting with modified shuss, the width will always remain the same and will be a function of the number of needles and the distance between them. There will be no shrinking during the knitting process. The width in the Modified Shuss Knitted Netting can differ only in quantum amounts equivalent to the distance between needles.

It may be appreciated that there are many distinct advantages to the instant invention. Insertion or removal of a single round piece is simple. Locating the right parts in the right place when different amounts of shuss modification are needed at different places across the netting is simplified, as a different thickness of the single round piece can be used. It is important that when the same amount of shuss modification is needed over the netting width, a single corrugated trick plate (as shown in FIG. 4a) may be used.

The amount of shuss modification created on the complete netting width can be varied to some degree by regulating the shuss tension. This is done by regulating the shuss tension on the existing machine. Only when a different amount of modified shuss across the netting width is needed would different single round pieces (distinguishable by their different thicknesses) be used.

Figure 5:
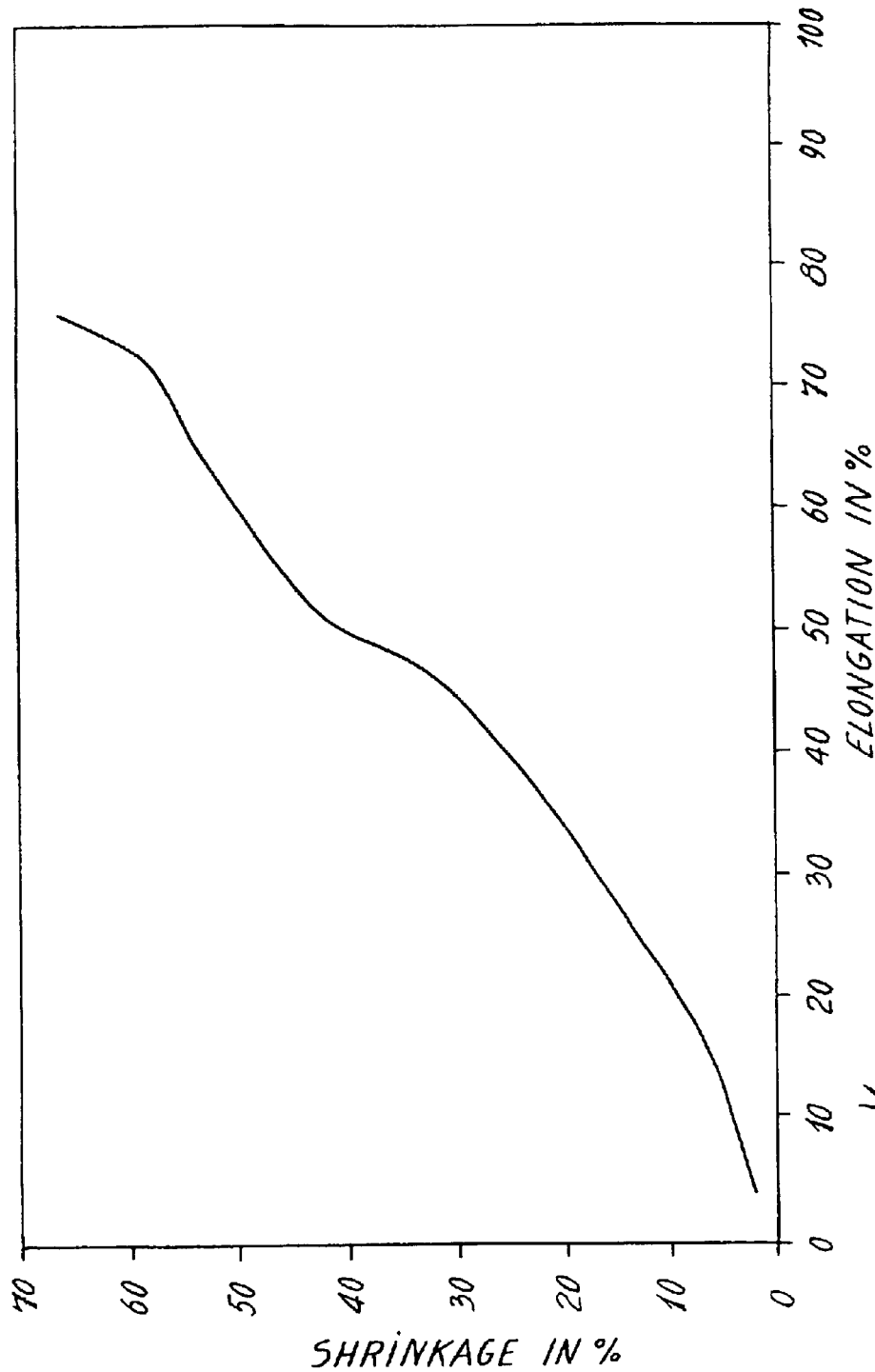
FIG. 5 shows a shrinkage/elongation curve for conventional knitted netting.

It may be appreciated by those skilled in the art that the Modified Shuss Knitted Netting according to the invention provides many unexpected advantages over conventional knitted netting. In particular, the Modified Shuss Knitted Netting is somewhat stronger, perhaps because the shusses don't create radial stresses on the franzes as in conventional knitted netting. Comparing FIGS. 5 and 6, it may be appreciated that the slope of the shrinkage/elongation curve created by the Modified Shuss Knitted Netting is a function of the amount by which the shuss is modified. A very small degree of shrinkage always occurs in the Modified Shuss Knitted Netting at the moment when longitudinal force is applied.

Figure 6:
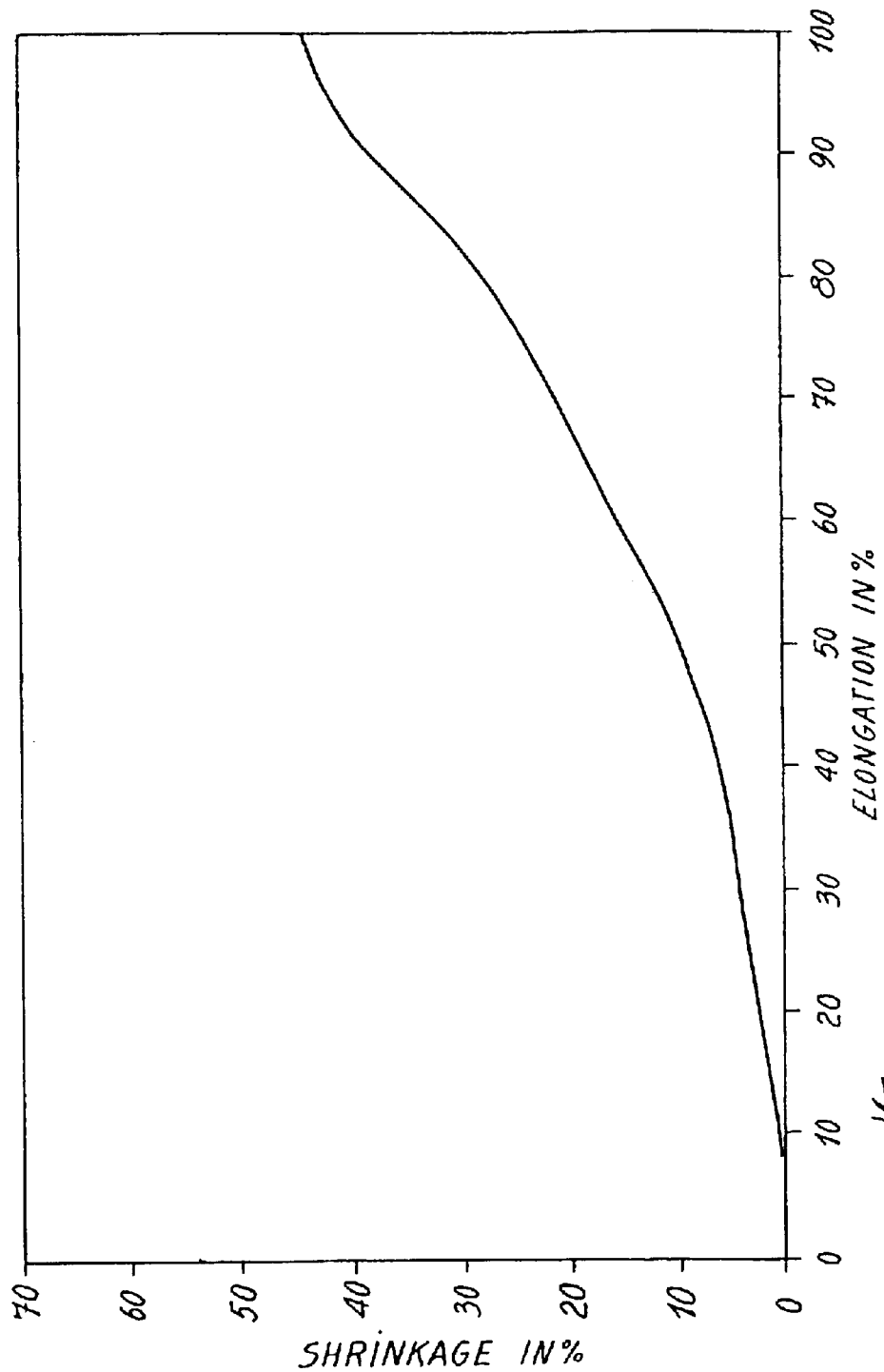
FIG. 6 shows a shrinkage/elongation curve for knitted netting according to the invention.

The shrinkage-elongation curve for modified shuss netting prepared in accordance with the present invention is depicted in FIG. 6. By noting the grid projected by the % Shrinkage and % Elongation indicia on the x-y axes of FIG. 6, it can be readily seen that for the modified shuss netting produced in accordance with the present invention at elongation of between about 10% and about 20%, the modified shuss netting exhibits shrinkage of greater than 0% and up to about 10%; at elongation of between about 20% and about 50% the modified shuss netting in accordance with the present invention exhibits shrinkage of between more than 0% and up to about 10%; at elongation of between about 50% and about 80%, the modified shuss netting in accordance with this invention exhibits a shrinkage of between about 10% and about 30%; at elongation of between about 80% and about 100% the modified shuss netting in accordance with the present invention exhibits a shrinkage of between about 20% and about 50%.

Figure 7:
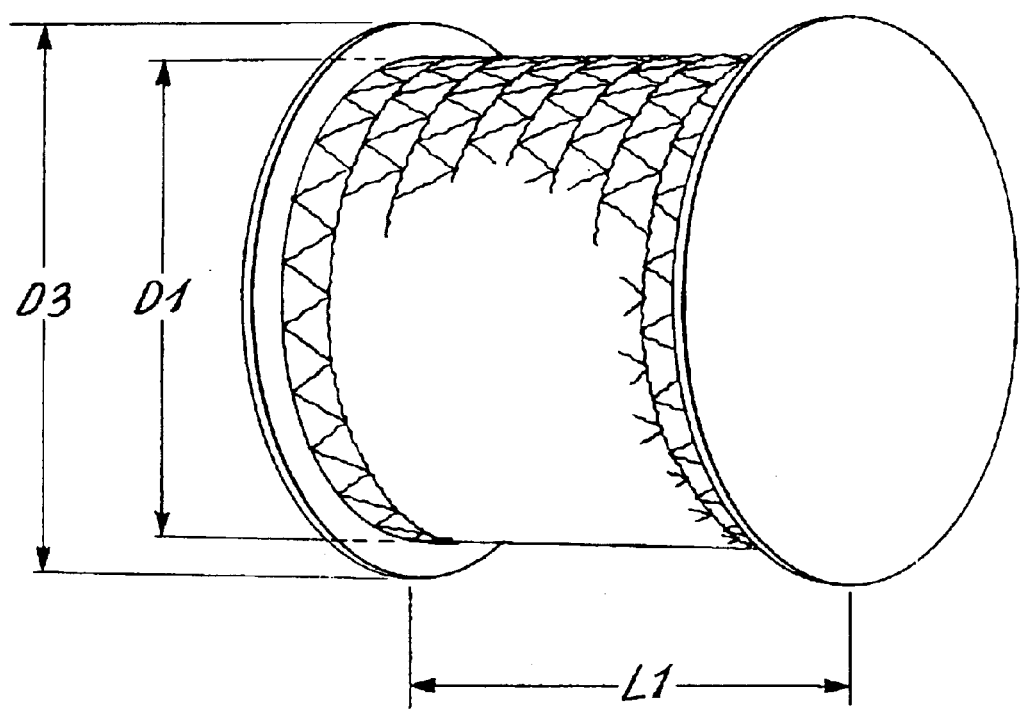
FIG. 7 shows a hay bale wrapped with conventional knitted netting.
Figure 8:
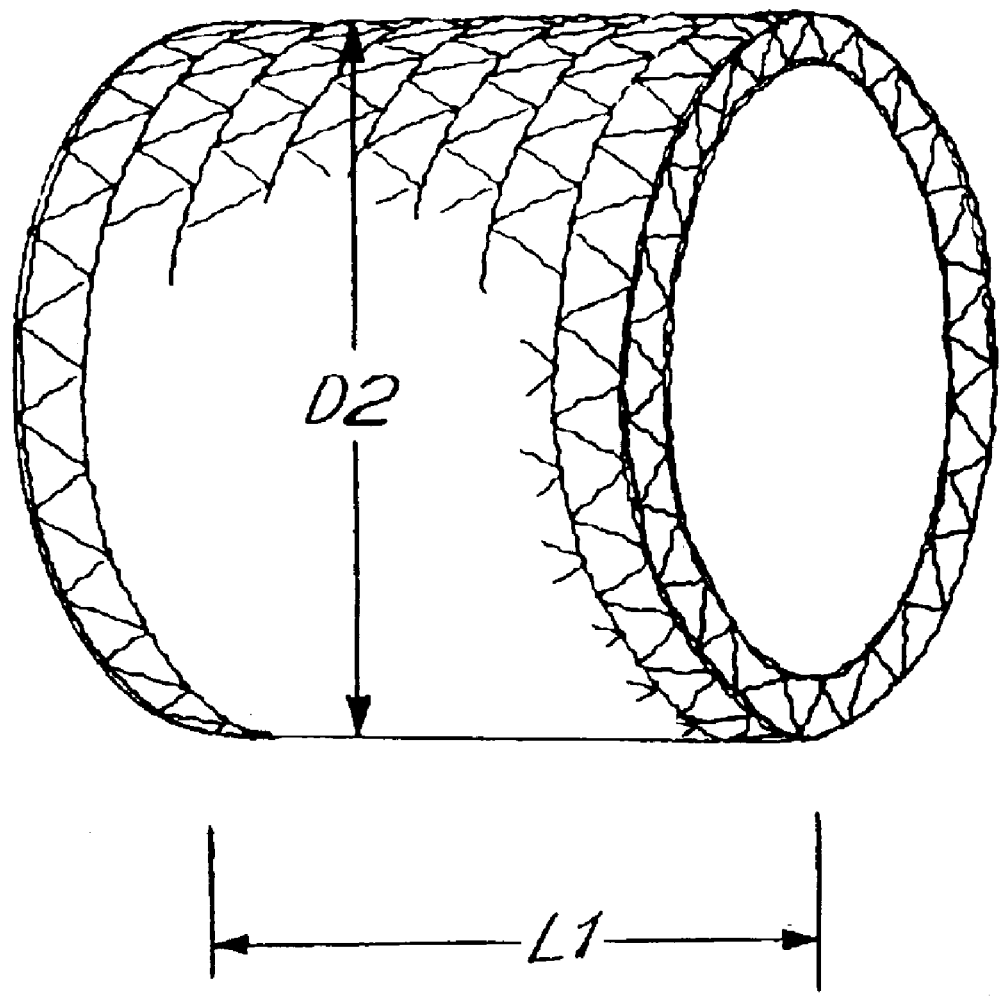
FIG. 8 shows a hay bale wrapped with knitted netting according to the invention.

Comparing FIGS. 7 and 8, when wrapping a round hay bale by using Modified Shuss Knitted Netting wider than the bale, a considerable amount of over-edge coverage is achieved considering the number of franzes on the outside of the hay bale. (Note that in the figures D1=D2, L1=L2, and D3>D2.) Over-edge-wrapping of hay bales provides the advantage of increasing the covered area on both sides of the bale. Because the franze length would be reduced on the smaller diameter at the extremities, some folding or pleating would be expected to occur as the net spread over the edge. However, the amount of over edge coverage has been found to be a function of the net elongation while wrapping and the amount of modified shuss. For example, if the circumference length of the last franze is x % shorter and the bale wrapping is performed with an x+1% stretch, then the last franze will create a 1% elongation. In this case, even if the shorter franze stretches only 1%, the shusses spread to their maximum length with respect to the length of the modified shuss. Therefore, the distance between the two franzes in this case is larger than the distance between the two needles on the machine. The netting merely does not shrink in width when wrapped around the bale (the distances between franzes remain nearly constant without narrowing), but on both sides of the bale, the distance between franzes becomes more than the distance between needles, due to radial forces that are created which spread the shusses to their maximum modified length. It may be noted that in U.S. Pat. No. 4,917,008 to van den Wildenberg, the over-edge coverage is accomplished using elastic elements on both opposite longitudinal edges. Such elastic elements aren't needed when using the instant invention, due to the new netting properties.

In addition to the foregoing properties, the new netting can also be widened to more than its original width, even where longitudinal force is applied on the netting. Such phenomenon is created on the peripheral portions of the bale as discussed above.

While the invention has been described in its preferred embodiments, it is to be understood that the words which have been used are words of description, rather than limitation, and that changes may be made within the purview of the appended claims without departing from the true scope and spirit of the invention in its broader aspects.

For example, the new invention is applicable to all kinds of netting containing longitudinal franze and lateral shusses. Even in netting with horizontal shusses which create quadrant openings there will be an advantage if it is knitted with modified shuss. Such netting usually doesn't shrink on its lengthwise direction; but without modified shuss it couldn't be widened to more than its original width. Further, the instant invention is not limited to any particular material or kind of strands, tapes, monofilament, multifilament, or the like. Still further, it may be appreciated that a knitted netting may be produced with only some loosened shusses on both sides or at any place along the net width, the netting can be widened during wrapping process, at any predetermined area of the wrapped load, etc.

Knitted netting may also be produced with different amounts of shuss modification. If a given number of franzes are over the edge, by using higher shuss modification on those franzes would create higher coverage on both bale sides.

What is claimed:

1. A method of producing knitted netting, comprising:
   supplying lateral polyolefin ribbons and longitudinal polyolefin ribbons to a knitting machine;
   forming at least one modified lateral ribbon by passing said lateral ribbons over a trick plate having at least one corrugated or curved surface, said modified lateral ribbons having an actual ribbon length that is at least 10% greater than a calculated ribbon length while knitting the lateral polyolefin ribbons with the longitudinal polyolefin ribbons to form a knitted netting having at least one modified lateral ribbon,
   wherein said netting exhibits reduced lateral shrinkage relative to netting produced with an actual ribbon length equal to said calculated ribbon length upon elongation up to 100%.

2. The method according to claim 1, comprising forming modified lateral polyolefin ribbons along outside edges of said knitted netting.

3. The method according to claim 1, wherein all of said lateral polyolefin ribbons are formed to have an actual length that is at least 10% greater than said calculated ribbon length.

4. The method according to claim 1, wherein said at least one modified lateral ribbon is formed to have an actual length that is at least 10%–30% greater than said calculated ribbon length.

5. The method according to claim 3 wherein all of said lateral polyolefin ribbons are formed to have an actual length that is at least 30% greater than said calculated ribbon length.

6. The method of claim 1, wherein the corrugated or curved surface is a separate piece attached to the trick plate.

7. A process of producing knitted netting exhibiting reduced lateral shrinkage, comprising:
   feeding longitudinal and lateral polyolefin ribbons to a knitting machine, knitting said longitudinal polyolefin ribbons with at least one modified lateral polyolefin ribbon in a knitting machine by forming at least one modified lateral ribbon by passing said lateral ribbons over a trick plate having at least one corrugated or curved surface, said modified lateral ribbons having an actual ribbon length that is at least 10% greater than a calculated ribbon length to form a knitted netting which upon elongation up to 100% exhibits reduced lateral shrinkage relative to knitted netting produced with and actual ribbon length equal to said calculated ribbon length.

8. The process according to claim 7, comprising knitting said longitudinal polyolefin ribbons with a plurality of modified lateral polyolefin ribbons.

9. The process according to claim 7, wherein said lateral shrinkage is about 12% upon elongation of about 60%.

10. The process according to claim 8, wherein said lateral shrinkage is greater than 0% lateral shrinkage and less than 10% upon elongation of between about 20% and about 50%.

11. The process according to claim 8, wherein said lateral shrinkage is between about 10% and about 20% upon elongation of between about 50% and about 70%.

12. The process according to claim 8, wherein said lateral shrinkage is between about 20% to about 30% upon elongation of between about 50% and about 80%.

13. The process according to claim 8, wherein said lateral shrinkage is between about 20% to about 50% upon elongation of between about 80% and 100%.

14. The process of claim 7, wherein the corrugated or curved surface is a separate piece attached to the trick plate.

15. A process of producing knitted netting exhibiting reduced lateral shrinkage, comprising:

feeding longitudinal and lateral polyolefin ribbons to a knitting machine, knitting said longitudinal polyolefin ribbons with at least one modified lateral polyolefin ribbon in a knitting machine by forming at least one modified lateral ribbon by passing said lateral ribbons over a trick plate having at least one corrugated or curved surface, said modified lateral ribbons having an actual ribbon length that is at least 10%–30% greater than a calculated ribbon length to form a knitted netting which exhibits reduced lateral shrinkage upon elongation up to 100% relative to knitted netting produced with and actual ribbon length equal to said calculated ribbon length.

16. The process according to claim 15, comprising knitting with a plurality of said modified lateral polyolefin ribbons.

17. The process according to claim 16, wherein said lateral shrinkage is about 12% upon elongation of about 60%.

18. The process according to claim 16, wherein lateral shrinkage is greater than 0% and less than 10% upon elongation of between about 20% and about 50%.

19. The process according to claim 16, wherein said lateral shrinkage is between about 10% and about 20% upon elongation of between about 50% and about 70%.

20. The process according to claim 16, wherein said lateral shrinkage is between about 20% to about 30% upon elongation of between about 50% and about 80%.

21. The process according to claim 16, wherein said lateral shrinkage is between about 20% to about 50% upon elongation of between about 80% and about 100%.

22. The process of claim 15, wherein the corrugated or curved surface is a separate piece attached to the trick plate.

23. A method of producing knitted netting, comprising:

knitting polyolefin ribbons with a trick plate having at least one outwardly curved surface element to form knitted netting having longitudinal polyolefin ribbons and lateral polyolefin ribbons, wherein at least one of said lateral polyolefin ribbon is modified to have an actual length which is at least 10% greater than a calculated ribbon length, to produce knitted netting which exhibits reduced lateral shrinkage upon elongation up to 100% relative to netting produced with an actual ribbon length equal to said calculated ribbon length.

24. The process according to claim 23, comprising knitting with a trick plate having a plurality of outwardly curved surface elements.

25. The process according to claim 23, wherein said lateral shrinkage is about 12% upon elongation of about 60%.

26. The process according to claim 23, wherein lateral shrinkage is greater than 0% and less than 10% upon elongation of between about 20% and about 50%.

27. The process according to claim 23, wherein said lateral shrinkage is between about 10% and about 20% upon elongation of about 50% and about 70%.

28. The process according to claim 23, wherein said lateral shrinkage is between about 20% to about 30% upon elongation between about 50% and about 80%.

29. The process according to claim 23, wherein said lateral shrinkage 4 between about 20% to about 50% upon elongation of between about 80% and about 100%.

* * * * *